US007646115B2

(12) United States Patent
Illegems

(10) Patent No.: US 7,646,115 B2
(45) Date of Patent: Jan. 12, 2010

(54) REGULATOR CIRCUIT WITH MULTIPLE SUPPLY VOLTAGES

(75) Inventor: Paul F. Illegems, Tucson, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 246 days.

(21) Appl. No.: 11/620,246

(22) Filed: Jan. 5, 2007

(65) Prior Publication Data

US 2008/0164765 A1 Jul. 10, 2008

(51) Int. Cl.
*H02J 1/00* (2006.01)
*G05F 1/00* (2006.01)

(52) U.S. Cl. ............................ 307/80; 307/81; 307/82; 307/85; 307/86; 307/87; 323/268; 323/271; 323/272

(58) Field of Classification Search .................. 307/80, 307/81, 82, 85, 86, 87; 323/268, 271, 272
See application file for complete search history.

(56) References Cited

U.S. PATENT DOCUMENTS

| | | | | |
|---|---|---|---|---|
| 5,422,591 | A | 6/1995 | Rastegar et al. | |
| 5,739,705 | A * | 4/1998 | John | 327/74 |
| 6,304,069 | B1 | 10/2001 | Tatsumi | |
| 6,324,426 | B1 | 11/2001 | Thompson | |
| 6,366,061 | B1 | 4/2002 | Carley et al. | |
| 6,388,469 | B1 | 5/2002 | Hunt et al. | |
| 6,396,169 | B1 | 5/2002 | Voegeli et al. | |
| 6,686,600 | B2 | 2/2004 | Sadayama | |
| 6,826,096 | B2 | 11/2004 | Pekny et al. | |
| 6,833,760 | B1 | 12/2004 | Aude | |
| 6,838,942 | B1 | 1/2005 | Somerville et al. | |
| 6,864,600 | B2 | 3/2005 | Malinovitch | |
| 6,944,843 | B2 | 9/2005 | Bansal | |
| 7,205,682 | B2 * | 4/2007 | Kuramori | 307/80 |
| 7,254,002 | B2 * | 8/2007 | Aemireddy | 361/84 |
| 2003/0122429 | A1 | 7/2003 | Zhang et al. | |

* cited by examiner

*Primary Examiner*—Albert W Paladini
*Assistant Examiner*—Hal I Kaplan
(74) *Attorney, Agent, or Firm*—Meyertons Hood Kivlin Kowert & Goetzel, P.C.; Jeffrey C. Hood

(57) ABSTRACT

A regulator circuit may be configured to operate with multiple power supplies. The regulator circuit may be configured to receive an input voltage and provide a regulated output voltage at an output terminal as a function of the input voltage. The regulator may include at least two drivers. A first driver may have a driver output coupled to the output terminal and have a supply terminal coupled to a high power supply, and a second driver may have a driver output coupled to the output terminal and have a supply terminal coupled to a low power supply. A selector circuit may be configured to compare the input voltage with a control voltage that has a magnitude just below a magnitude of the low power supply, to determine which driver to select from the first driver and the second driver, and enable either the first driver output or the second driver output to be active according to which driver has been selected. The regulator circuit may be configured to operate with any number of power supplies by including corresponding drivers and selection logic in the selector circuit.

38 Claims, 5 Drawing Sheets

REGULATOR CIRCUIT WITH MULTIPLE SUPPLY VOLTAGES

BACKGROUND OF THE INVENTION

1. Field of the Invention

This invention relates generally to voltage/current driver/regulator circuit design and, more particularly, to the design of a regulator circuit operating with multiple supply voltages.

2. Description of the Related Art

A variety of driver circuits exist today for use in integrated circuits and systems for driving a signal line or a bus. Oftentimes driver circuits are configured to enable bus transactions between a source device and a target device, and feature complex designs in order to meet various system specifications. Typically, these driver circuits may be relatively expensive to build. Other driver circuits may feature simple or simpler designs, failing, however, to accurately control output currents and output voltages, while also having slow rise and fall times.

One variety of driver circuits generally comprises a relatively low power circuit that drives, or controls, a higher power device, which may be part of a power driving stage for a load. One example might be a load that is a motor, such as a brushless motor, that provides the motive force for a fan. Fans are oftentimes used in computer systems to evacuate hot air from enclosures to prevent certain circuit components, such as central processing units (CPUs) from overheating. Linear driver circuits are therefore often used to drive the fan motor, and/or controlling the rotational speed of the fan in a wide variety of computer systems.

Linear drivers are also a feature of output stages in many amplifiers—whose basic function is to produce an output signal with a power that is a multiple of the power of an input signal—since many applications call for an output waveform that faithfully reproduces the shape of the input signal while magnifying its voltage and/or current in a linear fashion. In order to increase the efficiency of an amplifier while maintaining a high degree of linearity, a class G design may be employed, which involves changing the power supply voltage from a lower level to a higher level when larger output swings are required.

A variety of methods and solutions exist for implementing class G operation in an efficient manner. The simplest solution typically involves a single class AB output stage connected to two power supply rails by a diode, or a transistor switch. In this solution, under most circumstances, the output stage is connected to the lower supply voltage, and automatically switches to the higher rails for large signal peaks. Another approach features two class AB output stages, each stage connected to a different power supply voltage, with the signal path determined by the magnitude of the input signal. Using two power supplies improves power efficiency enough to allow significantly more power for a given size and weight.

Class G amplifiers typically include current blocking diodes configured to prevent driving current into a lower voltage supply when the amplifier output exceeds the lower supply voltage. While this provides effective protection, it also places a limit on the efficiency of the contribution provided by the lower voltage power supplies to the overall amplifier output. Some power will unavoidably be dissipated in the diode as a result of the voltage drop across the diode, any time a lower voltage supply is contributing to the overall output of the amplifier. In addition, a power device typically included in each output stage to control the flow of current to the load will dissipate power that is equal to the load current multiplied by the difference between the supply voltage and the amplifier output. This power would be wasted any time the supply contributed to the amplifier output.

When a power supply is contributing maximum current to the amplifier output, the output device may be operating in either saturation mode or linear mode, generally with a voltage drop in the tenth volt range (typically few tenths of a volt). When the voltage drop across the output device is combined with the voltage drop across the diode when using a lower voltage supply, the total difference between the supply voltage and the amplifier output may be around one volt. While such a voltage drop and corresponding inefficiency may be acceptable in relatively high voltage amplifiers where the output is in the 10V range (typically tens of volts), integrated circuit amplifiers for low-power applications are typically designed to operate with minimum supply voltages below two volts, and such a drop in output stage voltage would limit the amplifier's maximum efficiency to less than fifty percent.

One solution for the design of more efficient class G amplifiers is described in U.S. Pat. No. 6,838,942 (Efficient class-G amplifier with wide output voltage swing). According to this solution, the amplifiers include multiple output stages, each associated with a distinct supply voltage, the amplifiers thereby operating off of multiple supply voltages. Each output stage contributes current to the output of the amplifier over a range of amplifier output voltages, with possibly overlapping voltage ranges. Each output stage also contributes current until the amplifier output voltage reaches the supply voltage associated with that output stage. When the amplifier output voltage is close to the supply voltage associated with an output stage, both that output stage and the output stage associated with the next highest supply voltage may contribute to the amplifier output.

Certain drawbacks of this solution are apparent, however. For example, current may flow from a high supply to low supply during fast signal transients, causing extra power dissipation. This may occur due to the pass devices to the two supplies conducting simultaneously, in addition to the slow speed of the control loop. Another issue may be the less than optimal power saving due to a transition region from one supply to the next supply having a value in the 100 mV range (typically hundreds of mV). Finally, the feedback loop can be very difficult to stabilize.

Other corresponding issues related to the prior art will become apparent to one skilled in the art after comparing such prior art with the present invention as described herein.

SUMMARY OF THE INVENTION

A voltage regulator (or driver) circuit may be designed with the primary goal to save power. The regulator circuit may be coupled to at least two power supplies configured to provide a supply voltage to the regulator circuit. In order to save power, the regulator circuit may take current from the lowest possible supply according to the value of an input signal, while maintaining an accurate output level.

In one set of embodiments, a voltage regulator, e.g. a linear regulator may be configured to drive a load from one of two pass devices, which may be pass transistors, e.g. PMOS devices. The two pass transistors may each be connected to a respective one of two different power supplies (voltage supplies). The voltage regulator may also be configured to receive an input voltage to set the output voltage, and may include an error amplifier to compare the input voltage to the output voltage to control the output voltage through a feedback loop that may be configured to set a fixed gain. The regulator may further include a selector circuit having transistors configured to enable selection of one of the pass transistors. The pass transistors may be configured to not operate at the same time, with only one pass transistor selected at a time. The decision to switch between the two pass devices, and thus determining which of the two power supplies is used in generating the output voltage, may be made by a comparator configured to compare the input voltage with a control voltage that has a magnitude that is just below the magnitude of the lower one of the two power supplies.

In another set of embodiments, a voltage regulator may be configured to receive an input voltage, and generate and provide a regulated output voltage as a function of the input voltage. Each one of two or more voltage supplies may have a different value and may power a different corresponding driver configured within the voltage regulator. Each different driver may have a driver output coupled to the output terminal of the voltage regulator to drive the regulated output voltage when the given driver is active. A voltage generator circuit, which may be configured within the voltage regulator, may be operable to generate a plurality of control voltages, each control voltage corresponding to a respective one of the voltage supplies, with the magnitude of each control voltage set just below the magnitude of the voltage supply to which it corresponds. The voltage regulator may also include a switching circuit configured compare the input voltage with each one of the control voltages, and enable one of the drivers to be active while keeping all other drivers inactive at any given time, based on the result of the comparisons. The driver may be selected and enabled based on which given control voltage of all the control voltages has a value that is closest to the value of the input voltage without being lower than the value of the input voltage. The enabled driver would then be the driver powered by the power supply corresponding to the given control signal.

A method for providing a regulated output signal using multiple power supplies may include powering each one of two or more drivers using a different corresponding power supply, each power supply having a different value (magnitude). A set of control voltages may be generated, with each control voltage corresponding to a respective power supply, and having a value just below the value of the power supply to which it corresponds. The method may further include receiving an input voltage, comparing the input voltage with each control voltage, and enabling one of the drivers to become active to operate as an active driver, according to the results of the comparison of the input voltage with each control voltage. When enabling one of the drivers, all other drivers may be kept inactive, and the regulated output signal may be provided as a function of the input signal using the active driver. The method may include determining which driver to enable by selecting the driver that is powered by the power supply whose corresponding control voltage is closest in value to the input voltage (when compared with the other control voltages) without being lower than the value of the input voltage.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
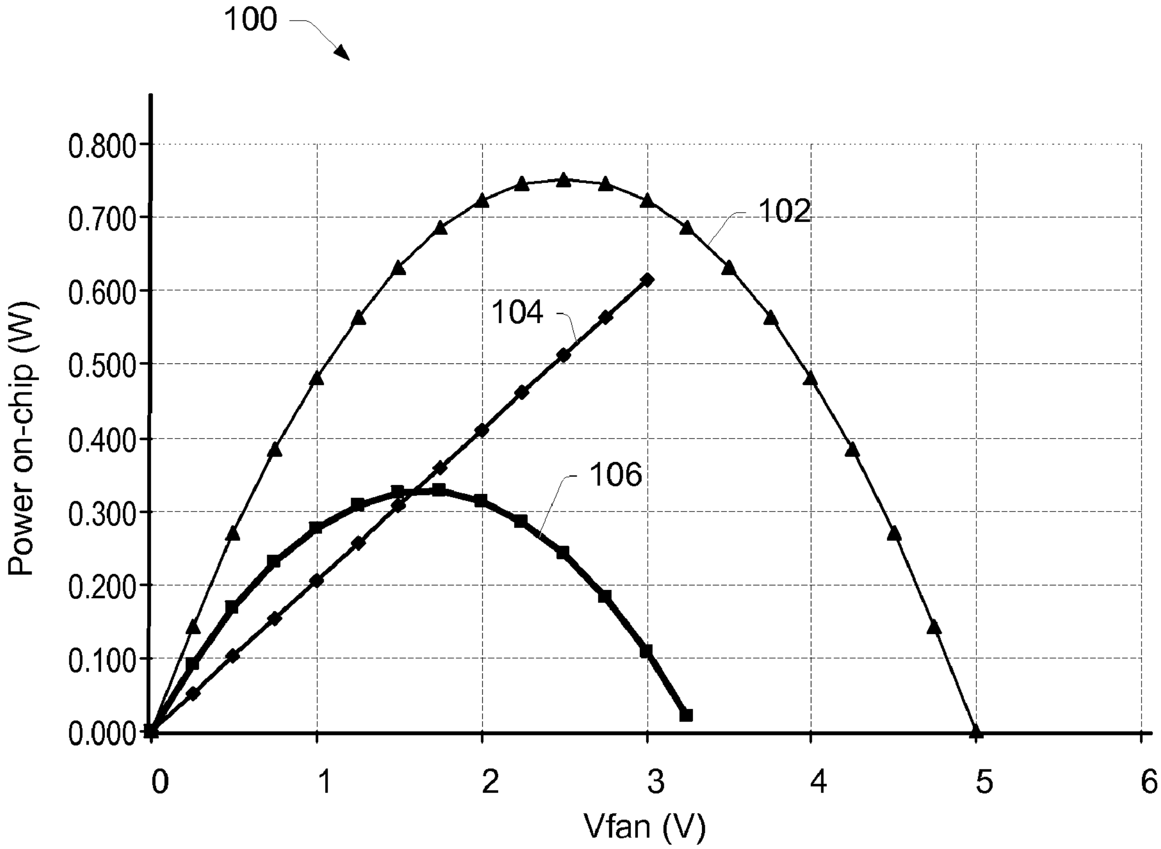
FIG. 1 shows a graph illustrating power dissipation for a voltage regulator circuit that utilizes dual supply voltages, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, the "magnitude" of a power supply refers to the magnitude of the supply signal provided by the power supply. For example, the magnitude of a voltage supply refers to the magnitude of the voltage signal provided by the voltage supply. E.g. a voltage supply having a magnitude of 5V indicates that the voltage supply is configured to provide a 5V supply rail and/or supply voltage. As also used herein, a "ratio" of a current mirror device refers to a ratio between the current conducted by the input branch of the current mirror and the current conducted by the output, or mirror branch of the current mirror. Thus, a current mirror having a "very high" ratio may indicate that the ratio of the input current vs. the mirrored current is approximately 1:1000. Furthermore, the "size" of a transistor or transistor device may refer to the channel width to channel length ratio of the transistor device. Thus, a "large" transistor may have a channel width to channel length ratio of around 10000/0.35. Finally, as used herein, the terms "driver circuit" and "regulator circuit" are meant to refer to the same type of circuit, and are used interchangeably.

One goal when designing a driver circuit, e.g. a voltage driver, may be to save power. One typical implementation of a driver circuit is a linear driver used for driving, for example a fan, with the linear driver configured on an integrated circuit (IC). If the driver circuit were connected to two power supplies, in order to save power the regulator circuit may take current from the lowest possible supply, while maintaining an accurate output level. FIG. 1 shows a graph illustrating power dissipation for a voltage regulator circuit that utilizes dual supply voltages, according to one embodiment. The graph in FIG. 1 illustrates an example of the power saving that may be obtained by using the lowest possible supply voltage for a fan driver with a 3.3 V and a 5 V supply. The parabolic curves 102 and 106 correspond to (and illustrate) the power dissipation in the driver circuit when using 5V and 3.3V supply voltages, respectively. The linear function 104 illustrates the power dissipation reduction that may be obtained by switching from the 5V power supply to the 3.3V power supply when the required supply voltage is almost at or below 3.3V. The curves in the example shown in FIG. 1 correspond to a fan load of approximately 8.3Ω.

Figure 2:
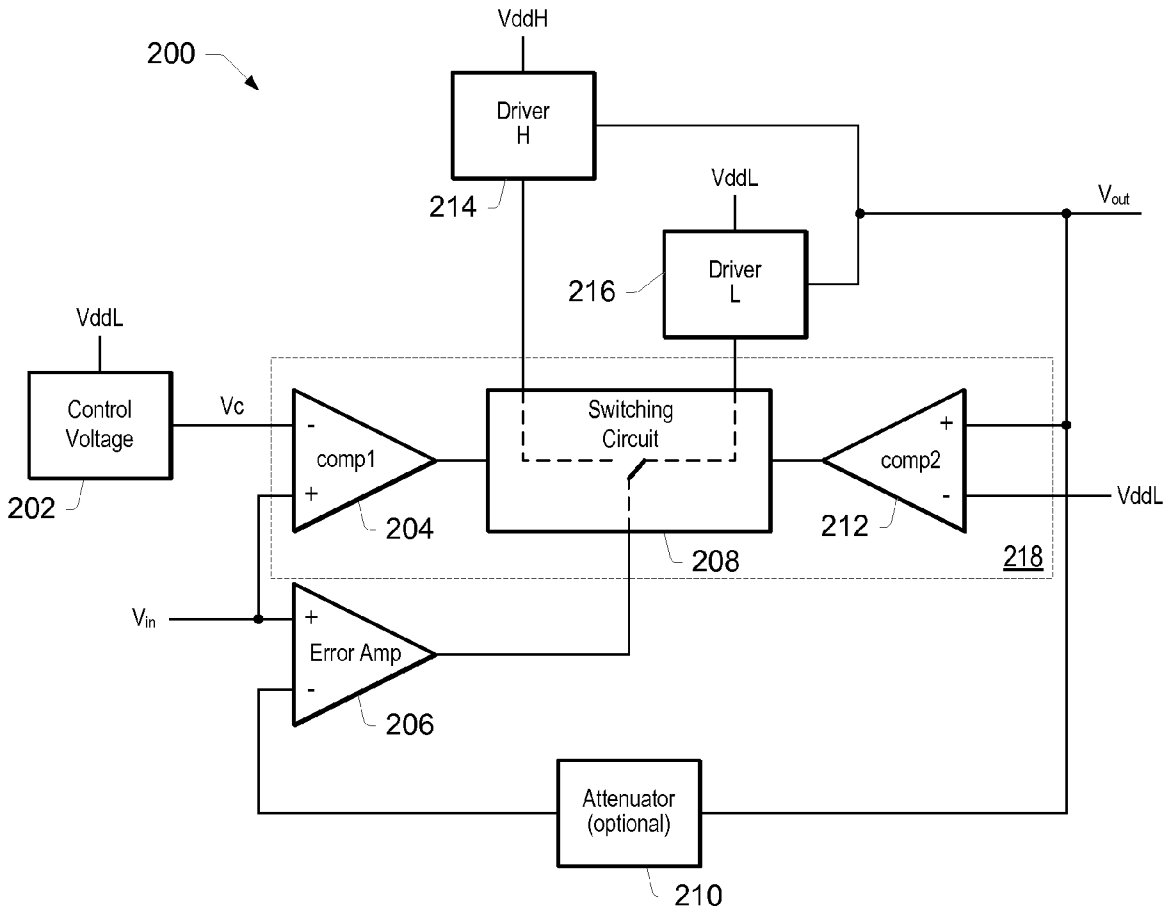
FIG. 2 shows a block diagram of a voltage regulator circuit that utilizes a high-power supply and a low-power supply, according to one embodiment.

FIG. 2 shows one embodiment of a voltage regulator 200, which may be configured to drive a load from one of two drivers, 214 and 216. Driver 214 may be powered by a high power supply VddH, e.g. 5V, while driver 216 may be powered by a low power supply VddL, e.g. 3.3V. Alternate embodiments may include power supplies having different values, with VddH corresponding to a higher voltage (or power) than VddL. Regulator 200 may be configured to receive an input voltage $V_{in}$ to set the output voltage $V_{out}$, and may include an error amplifier 206 to compare $V_{in}$ to $V_{out}$ in order to control $V_{out}$ through a feedback loop that may be configured to set a fixed gain. In one embodiment the feedback loop comprises an attenuator 210. Regulator 200 may further include a selector circuit 218 configured to select between driver 214 and driver 216 with the aid of switching circuit 208, and to determine which of the two drivers, 214 or 216, to select.

Drivers 214 and 216 may be configured in regulator 200 in such a way that they do not operate at the same time, with only one of the two drivers selected at a time. The decision to switch between drivers 214 and 216, and thus determining which of the two power supplies—VddH or VddL—is used in generating $V_{out}$, may be made by a comparator 204 configured to compare $V_{in}$ with a control voltage Vc that may have a magnitude that is just below the magnitude of VddL. As configured in the embodiment of FIG. 2, Vc is a control voltage that $V_{in}$ has to surpass for switching circuit 208 to select driver 214 for driving $V_{out}$, based on the output of comparator 204. A second comparator 212 may be configured to inhibit driver 216 when $V_{out}$ is greater than VddL, by comparing $V_{out}$ with VddL, and controlling the operation of switching circuit 208 to select driver 214 if $V_{out}$ is greater than VddL. Cases when $V_{out}$ may be greater than VddL include instances when $V_{out}$ lags $V_{in}$ due to a large capacitive load at $V_{out}$, for example. In some embodiments, Vc may be generated by control voltage circuit 202, based on the low power VddL also used for powering driver 216.

Figure 3:
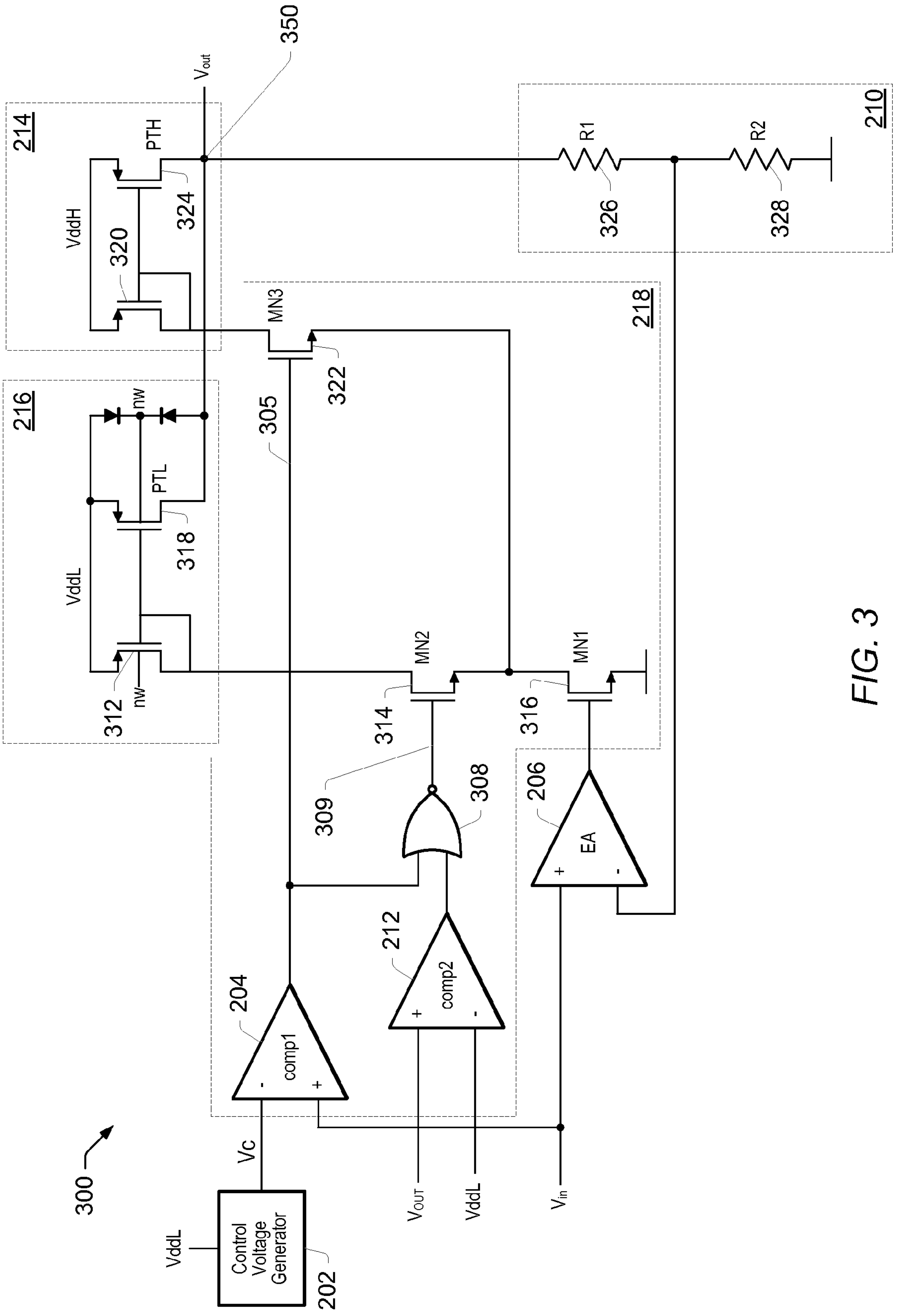
FIG. 3 shows a simplified transistor implementation of the voltage regulator circuit of FIG. 2, according to one embodiment.

FIG. 3 shows a circuit 300, which is a simplified transistor implementation of driver circuit 200. In one embodiment, driver 216 consists of a current mirror including pass transistor 318, which in this case is a PMOS device, coupling to PMOS device 312, and driver 214 consists of a current mirror including pass transistor 324, which is also a PMOS device, coupling to PMOS device 320. The current conducted by the channel (between the source and drain terminals) of pass transistor 318 may mirror the current conducted by the channel of PMOS device 312, which is configured as the input branch of the current mirror of driver 216. Similarly, the current conducted by the channel of pass transistor 324 may mirror the current conducted by the channel of PMOS device 320, which is configured as the input branch of the current mirror of driver 214. The current mirrors may each have a very high ratio, resulting in the mirrored currents being of a higher value than the input currents. In other words, the currents conducted by pass transistors 318 and 324 may actually be considerably higher than the corresponding respective input currents. In some embodiments this ratio may be around 1:1000, to minimize the current requirements in the respective input branch of each current mirror.

Pass transistors 318 and 324 may each be very large, their channel width to channel length ratio being on the order of W/L=10000/0.35, for example. Configuring large devices may facilitate achieving the high currents desired in the mirror branches of the pass transistors (318 and 324). It should be noted that while in this embodiment certain numerical values and ranges are provided for the ratio of the current mirrors and the size of pass transistors 318 and 324, other values may be used according to the desired size of the currents conducted by pass transistors 318 and 324 (mirror branches), and PMOS devices 312 and 320 (input branches).

In one set of embodiments, the n-well of the transistor devices comprised in driver 216 (in this case the n-well of PMOS devices 312 and 318) may be biased to a voltage level corresponding to the highest one of the magnitude of VddL and the magnitude of $V_{out}$, to avoid any current flowing from node 350 (where $V_{out}$ is provided) to the low power supply (or supply rail) VddL. NMOS devices 314 and 322 may be configured as switches within selector circuit 218 to select the appropriate pass transistor from the low power driver 216 or the high power driver 214. In one set of embodiments, the respective gains of the current mirrors configured in drivers 216 and 214, respectively, may be set to the same value, to insure that the feedback loop from node 350 to error amplifier 206 is not affected by switching between drivers 216 and 214. This may facilitate easy stabilization of the feedback loop. Selector circuit may also include logic gate (NOR) 308 and NMOS device 316 to implement the switching between drivers 216 and 214, as well as regulating the value of $V_{out}$ based on $V_{in}$, as controlled by error amplifier 206 via the feedback loop from node 350. In embodiments where an attenuator 210—constituting resistors 326 and 328 in the embodiment shown—is used in the feedback loop (effecting a gain of $V_{out}/V_{in}$ being greater than 1), the level of control voltage Vc may need to be equally attenuated, because it is $V_{in}$ and not $V_{out}$ that is compared to Vc by comparator 204.

Figure 4:
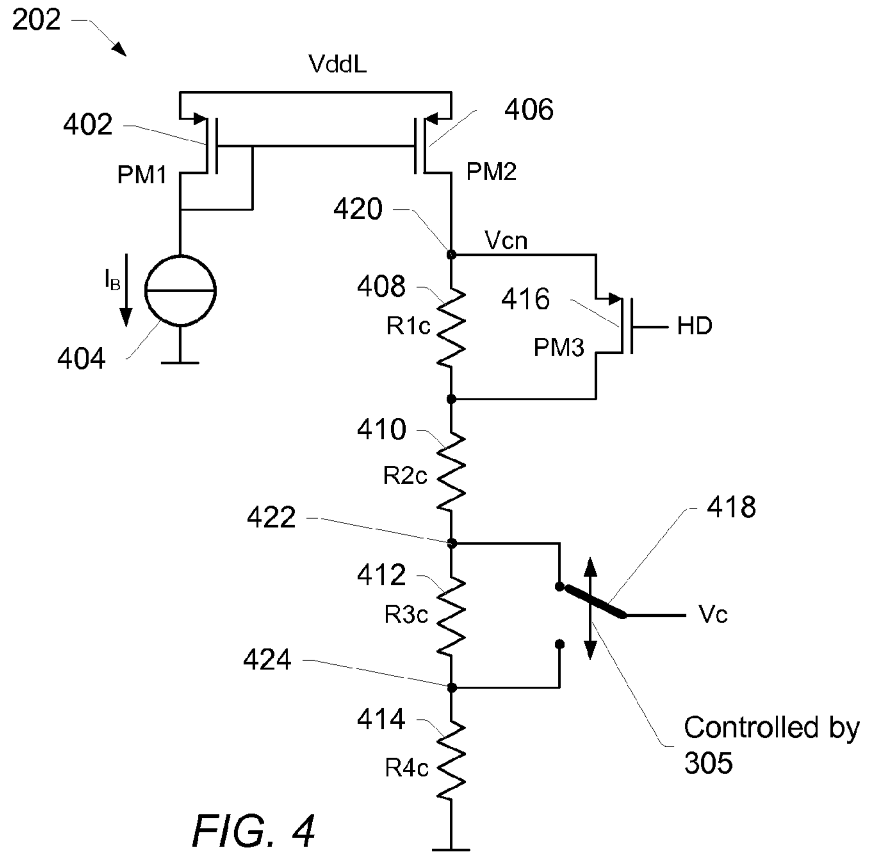
FIG. 4 shows a circuit diagram of the control voltage generator from FIGS. 2 and 3, according to one embodiment.

FIG. 4 shows one embodiment of control voltage generator (CVG) circuit 202, configured to provide Vc from either node 422 or 424. CVG circuit 202 may include a current mirror comprising an input PMOS device 402 coupled to a mirror PMOS device 406, with the channel of PMOS device 402 conducting a current that may be generated by current source 404. Resistors 408-414 may be configured to form a voltage divider, with an actual trip point Vcn developed at node 420. In the embodiment shown in FIG. 4, Vcn is the actual trip point where regulator circuit 200 may switch from one driver to another (i.e. from 214 to 216 or vice versa), and is generated by the drain-source voltage ($V_{Ds}$) of PMOS device 406, which may be of the same type as PMOS device 318 configured in driver 216 (shown in FIG. 3). In the circuit of FIG. 4, trip point Vcn may track VddL, and may be matched to the point where PMOS device 318 enters the linear region when $V_{out}$ is rising. Based on the state of regulator circuit 200, that is, whether $V_{out}$ is provided via driver 216 powered by VddL or via driver 214 powered by VddH, Vc may be adjusted to a slightly higher or slightly lower value to effectively create a small hysteresis, thereby increasing the robustness of regulator circuit 200. This may be performed via switch 418 configured across the terminals of resistor 412, with switch 418 operated by the output signal 305 received from comparator 204 to flip the switch between node 422 and node 424, to either decrease or increase Vc, with a higher value of Vc obtained at node 422 and a lower value of Vc obtained at node 424. Switch 418 may be coupled to node 424 when signal 305 is asserted (or is in a "high" state), and switch 418 may be coupled to node 422 when signal 305 is deasserted (or is in a low state). In addition, an optional switch 416 may be configured (as shown) across the terminals of resistor 408 to effect a small decrease of Vc for allowing a higher output current at node 350, where $V_{out}$ is provided.

Figure 5:
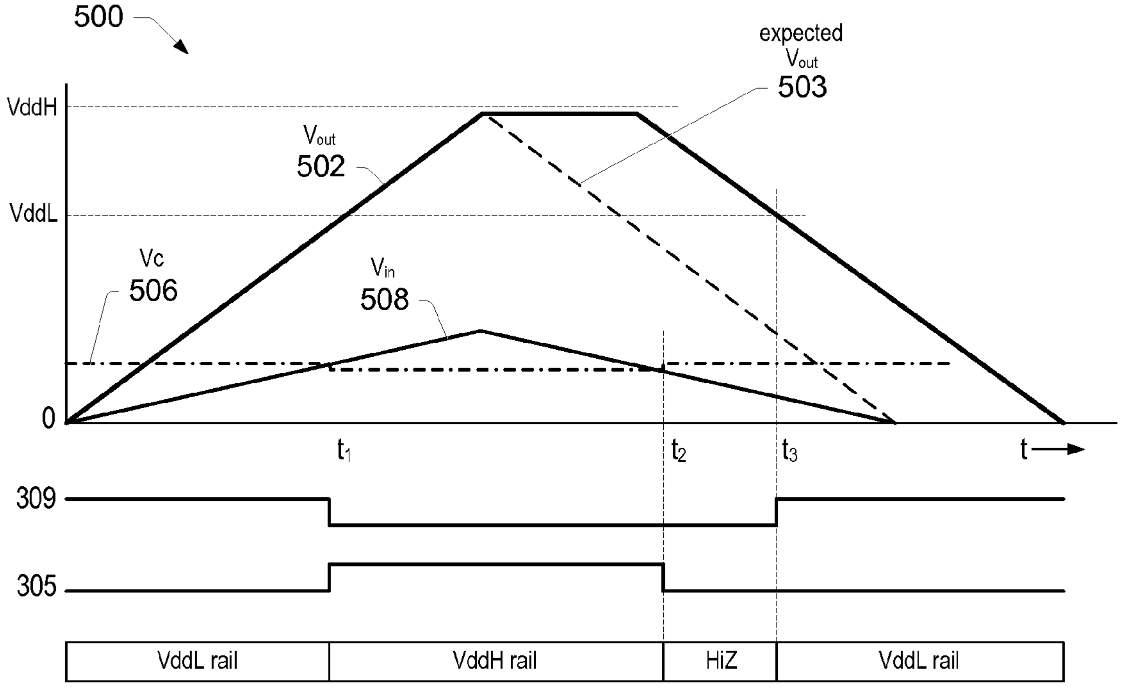
FIG. 5 shows a transfer characteristic and supply selection for the regulator circuit of FIG. 3, according to one embodiment.

FIG. 5 shows a graph 500 representing a sweep of $V_{in}$ (function curve 508), how $V_{in}$ affects $V_{out}$ (function curve 502), and which supply rail (VddL or VddH) is used. As shown in FIG. 5, at time $t_1$, $V_{in}$ reaches the level Vc, and the regulator circuit (e.g. regulator circuit 200) may switch from the driver powered by VddL (e.g. driver 216) to the driver powered by VddH (e.g. driver 214). Later, at time $t_2$ when $V_{in}$ drops below the level corresponding to Vc minus a hysteresis value, the driver powered by VddH may be turned off. In case $V_{out}$ is still higher than VddL, neither of the two drivers may be turned on until (the magnitude of) $V_{out}$ has dropped below VddL, in this case at time $t_3$, at which time the driver powered by VddL may be activated. $V_{out}$ may lag, as illustrated by the shift between the expected $V_{out}$ (function curve 503) and the actual $V_{out}$ (function curve 502), when $V_{out}$ is driving/powering large load capacitor, for example. FIG. 5 also illustrates the state of signals 309 (the output of logic gate 308) and 305 (the output of comparator 204) from FIGS. 2 and 3.

Figure 6:
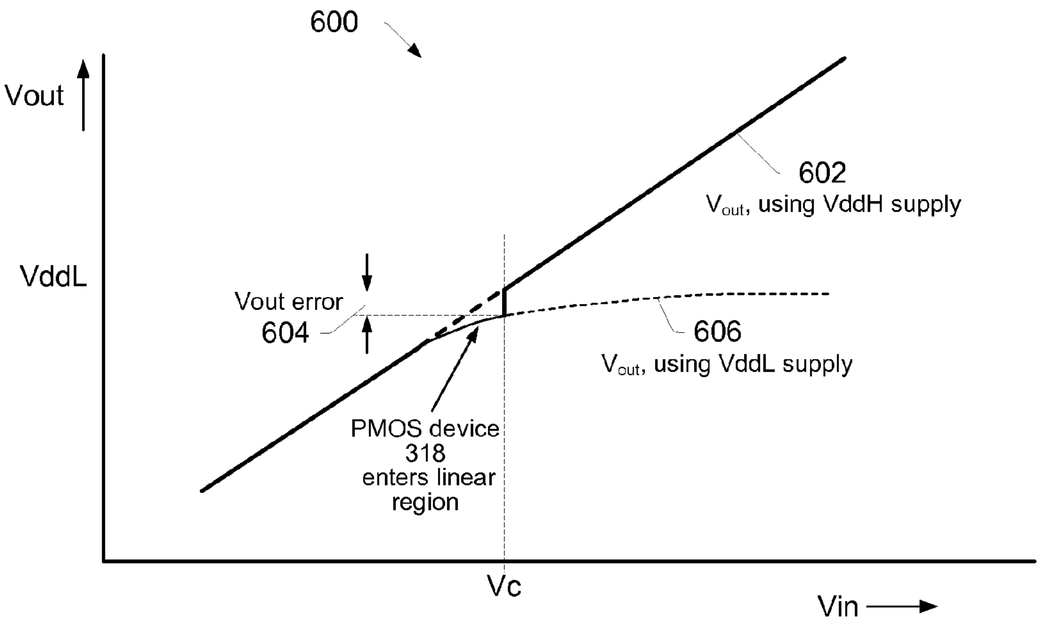
FIG. 6 shows a voltage diagram illustrating a possible error in the output voltage when the control voltage shown in FIGS. 2 and 3 is set too high, according to one embodiment.

Referring again to FIGS. 2 and 3, the feedback loop may be expected to remain closed, except when $V_{in}$ is greater than Vc and $V_{out}$ is greater than VddL. However, such a condition may not present a problem for regulator circuit 200. The point at which regulator circuit 200 switches from driver 216 to driver 214 may be specified to be lower than VddL, but as close to VddL as possible in order to maximize power saving. When $V_{out}$ is rising and approaches VddL, PMOS device 318 may cross from the saturation region to the linear operating region. The gain of the feedback loop may then decrease, possibly leading to $V_{out}$ having an error. This is illustrated in voltage diagram 600 of FIG. 6, which shows function curves 606 and 602, representing $V_{out}$ as a function of $V_{in}$ when using low supply VddL and high supply VddH, respectively. As seen in FIG. 6, when using low supply VddL, as $V_{out}$ approaches VddL, PMOS device 318 enters the linear operating region, causing $V_{out}$ (606) to deviate from what its value would be if high supply VddH were used, leading to $V_{out}$ error 604 at the time $V_{in}$ reaches Vc. One possible solution to minimize $V_{out}$ error 604 may be to set Vc by dimensioning the components of CVG circuit 202 such that the deviation in $V_{out}$ is minimal when regulator circuit switches from driver 216 (i.e. from the VddL supply rail) to driver 214 (i.e. to the VddH supply rail).

It should be noted, that in current drivers and/or regulators using multiple power supplies, (supply rails), there may be current flow from the high power supply to the low power supply during fast signal transitions, resulting in additional power dissipation. This current flow is most often the result of the pass devices (pass transistors)—comprised in the drivers powered by the high power supply and low power supply, respectively—simultaneously conducting current. Additionally, this behavior may also result from a potentially slow response of the control loop. A regulator circuit built in accordance with principles of the present invention, such as regulator circuit 200 shown in FIGS. 2 and 3, avoids this behavior by not allowing a state where it is possible for both drivers to be active, that is, to conduct current simultaneously. In other words, driver/regulator circuits designed and built according to principles of the present invention may feature multiple drivers powered by different respective power supplies/power rails, where only one of the drivers is active at a time while all the other drivers remain inactive, only the active driver conducting current to drive the output of the regulator/driver circuit to generate $V_{out}$.

Figure 7:
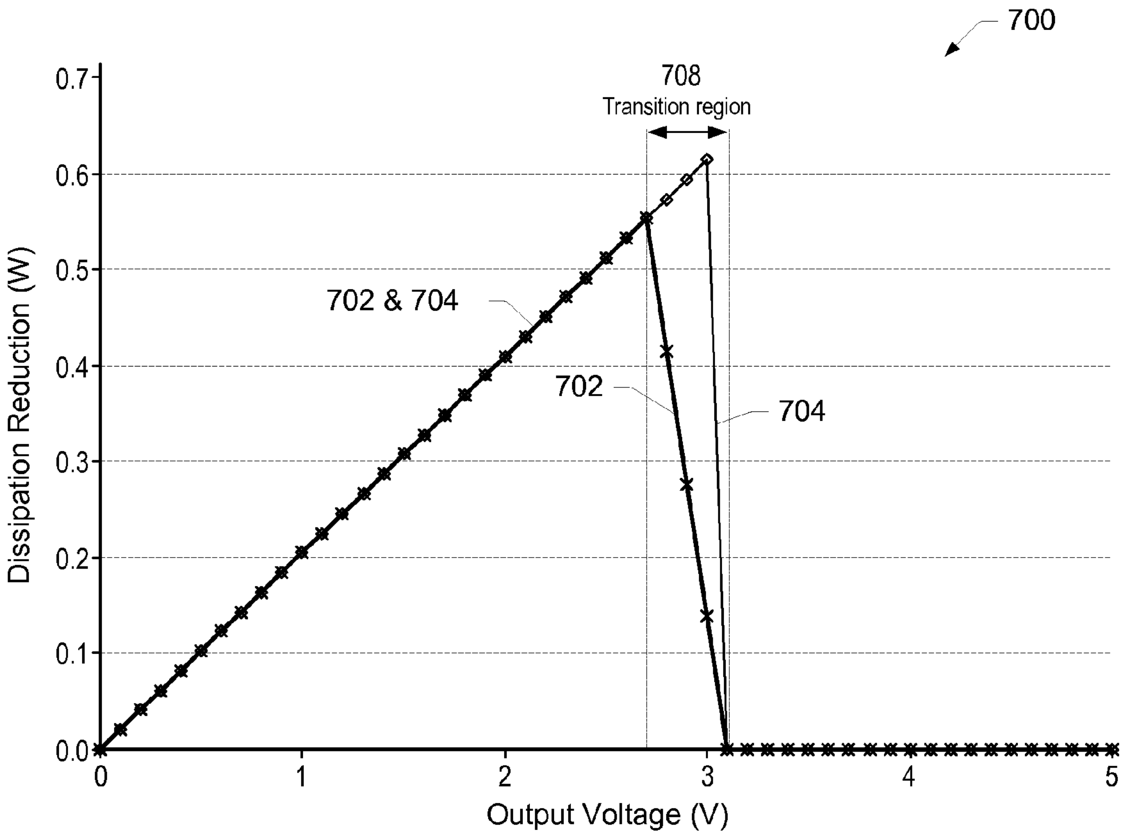
FIG. 7 shows a graph illustrating on-chip power dissipation reduction achieved when using the regulator circuit shown in FIGS. 2 and 3, according to one embodiment.

Consequently, power saving in current driver/regulator circuits using multiple power supplies/power rails may not be optimal due to the characteristics of the transition region when switching from one supply to another. FIG. 7 shows a graph illustrating on-chip power dissipation reduction achieved when using the regulator circuit shown in FIGS. 2 and 3, according to one embodiment. The regulator circuit (e.g. driver circuit 200) may switch hard from one supply to the next (e.g. from VddL to VddH), thereby maximizing the power savings. In the example graph shown in FIG. 7, function curve 702 represents the power savings achieved in a class G amplifier with respect to the output voltage of the amplifier, while function curve 704 represents the power savings achieved in a regulator circuit built according to principles of the present invention (e.g. regulator circuit 200) with respect to the output voltage of the regulator circuit. As illustrated in the graph, the gradual transition from one supply to the next, (shown in FIG. 7 as transition region 708), results in the power savings in the class G amplifier to peak at a voltage level considerably below the level at which the power savings in the regulator circuit peaks. The regulator circuit switches hard from one power supply to the next, as indicated by the steeper slope of function curve 704 when contrasted with the slope of function curve 702.

In addition, in current regulators/drivers/amplifiers that use multiple supplies, it may be problematic to stabilize the feedback loop, because the gain of the loop and phase shift may change when transitioning/switching from one supply rail to the next. When a driver/regulator circuit is designed and built according to principles of the present invention, it is possible to achieve a slight and sudden change in the gain and phase by properly dimensioning the components of the regulator circuit, thereby reducing and/or eliminating oscillations around the transition point.

It should be noted that while the embodiments presented herein are configured with one low supply rail and one high supply rail, other embodiments may include more than two supply rails, each supply rail possibly having a different value (magnitude) from all of the other supply rails. For example, in one set of embodiments, a regulator/driver circuit may include an input terminal configured to receive an input voltage and an output terminal configured to provide a regulated output voltage as a function of the input voltage. Each one of a plurality of power supplies may be configured to have a different magnitude and to power a different corresponding driver. Each different given driver may have a driver output coupled to the output terminal of the regulator circuit to drive the regulated output voltage when the given driver is active. The regulator circuit may also include a control voltage generator circuit configured to generate a plurality of control signals, with each control signal corresponding to a respective one of the power supplies, with the magnitude of each control signal set just below the magnitude of the corresponding power supply. The regulator/driver may further include a selector circuit configured to enable one of the drivers to be active while keeping all other drivers inactive at any given time, based on a comparison of the input voltage with each one of at least a subset of the control voltages. In this manner, only one of the drivers is enabled to drive the output voltage, the selection based on where the value/magnitude of the input voltage falls with respect to the magnitude of the various different power supplies used to power the drivers.

For example, the embodiment shown in FIGS. 2 and 3 may be expanded to any number of supply rails by adding comparators functionally matching comparator 204, and CVG generating circuits functionally matching CVG circuit 202. If there were for example four power supplies all having a different magnitude, a respective Vc value may be generated corresponding to each of the lowest three supplies (i.e. the three supplies having the lowest magnitudes among the four supplies), with the magnitude of each respective Vc being just below the value/magnitude of its corresponding power supply. $V_{in}$ may be compared to each Vc voltage, and one driver would be selected based on the result of the comparison. The selected driver may be the driver powered by the power supply corresponding to the control voltage—from among all three control voltages—that has a magnitude closest to the magnitude of $V_{in}$ while also being greater than or equal to the magnitude $V_{in}$.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A regulator circuit configured to operate with multiple power supplies, the regulator circuit comprising:

an input terminal configured to receive an input voltage;

an output terminal configured to provide a regulated output voltage, wherein the regulated output voltage is a function of the input voltage;

a first driver having a driver output coupled to the output terminal and configured to provide the regulated output voltage when active, the first driver further having a supply terminal coupled to a high power supply;

a second driver having a driver output coupled to the output terminal and configured to provide the regulated output voltage when active, the second driver further having a supply terminal coupled to a low power supply; and a first circuit operable to select between the first driver and the second driver, and enable either the first driver output or the second driver output to be active according to which driver has been selected;

wherein the first circuit is further operable to compare the input voltage with a control voltage that has a magnitude just below a magnitude of the low power supply, to determine which driver to select.

2. The regulator circuit of claim 1, wherein the first circuit is operable to select the first driver when a magnitude of the input voltage is greater than a magnitude of the control voltage.

3. The regulator circuit of claim 1, wherein a magnitude of the control voltage is specified to maximize power saving.

4. The regulator circuit of claim 1, further comprising a second circuit operable to compare the input voltage with the regulated output voltage, to control the regulated output voltage.

5. The regulator circuit of claim 4, wherein the second circuit comprises an input terminal coupled to the output terminal of the regulator circuit for forming a feedback loop with a fixed gain, to regulate the regulated output voltage to be proportional to the input voltage.

6. The regulator circuit of claim 5, wherein the feedback loop comprises an attenuator.

7. The regulator circuit of claim 1, wherein the first circuit is further operable to inhibit the second driver when a magnitude of the regulated output voltage is greater than the magnitude of the low power supply.

8. The regulator circuit of claim 1, further comprising a second circuit configured to couple to the low power supply and operable to generate the control voltage based on the low power supply.

9. The regulator circuit of claim 8, wherein the control voltage tracks the low power supply;

wherein the second circuit comprises:

two PMOS devices having their source terminals coupled to the low power supply, wherein the two PMOS devices are configured to form a current mirror; and a resistor circuit coupled to a drain terminal of a first one of the two PMOS devices, wherein the resistor circuit is configured to switchably provide an attenuated and non-attenuated version of the control voltage.

10. The regulator circuit of claim 9, wherein the second circuit further comprises a current source coupled to a drain terminal of the second one of the two PMOS devices.

11. The regulator circuit of claim 9, wherein the resistor circuit comprises a switching device configured to effect a decrease in the control voltage to allow a higher output current at the output terminal of the regulator circuit.

12. The regulator circuit of claim 8, wherein the second circuit is configured to increase and/or decrease the control voltage to provide hysteresis of the regulated output voltage with respect to the input voltage.

13. The regulator circuit of claim 1 wherein the first driver comprises a first current mirror and the second driver comprises a second current mirror.

14. The regulator circuit of claim 13 wherein the first current mirror and the second current mirror each have a very high ratio.

15. The regulator circuit of claim 13, wherein the first current mirror comprises a first pass transistor having a high channel width to channel length ratio and the second current mirror comprises a second pass transistor having a high channel width to channel length ratio.

16. The regulator circuit of claim 15, wherein the first pass transistor is a first PMOS device and the second pass transistor is a second PMOS device.

17. The regulator circuit of claim 16, wherein the first current mirror further comprises a third PMOS device coupled to the first PMOS device and the second current mirror further comprises a fourth PMOS device coupled to the second PMOS device.

18. The regulator circuit of claim 17, wherein an nwell of the second PMOS device and the fourth PMOS device is biased to a bias voltage having a magnitude commensurate with a greatest one of a magnitude of the regulated output voltage and the magnitude of the low power supply, to prevent current flowing from the high power supply to the low power supply.

19. The regulator circuit of claim 17, wherein the first circuit comprises:

a first comparator configured to compare the input voltage with the control voltage and provide a corresponding output;

a second comparator configured to compare the regulated output voltage with the value of the low power supply and provide a corresponding output; and a pair of switching devices configured to select between the first pass transistor and the second pass transistor according to the corresponding outputs provided by the first comparator and the second comparator.

20. The regulator circuit of claim 19, wherein the pair of switching devices comprise a first NMOS device and a second NMOS device;

wherein a gate terminal of the first NMOS device is coupled to the corresponding outputs provided by the first comparator and the second comparator, wherein a drain terminal of the first NMOS device is coupled to a drain terminal of the fourth PMOS device; and wherein a gate terminal of the second NMOS device is coupled to the corresponding output provided by the first comparator, wherein a drain terminal of the second NMOS device is coupled to a drain terminal of the third PMOS device.

21. The regulator circuit of claim 20, further comprising a second circuit operable to compare the input voltage with the regulated output voltage, and generate an output indicative of a difference between the input voltage and the regulated output voltage, to control the regulated output voltage;

wherein a source terminal of the first NMOS device and a source terminal of the second NMOS device are coupled to the output of the second circuit.

22. A method for providing a regulated output voltage using multiple power supplies, the method comprising:

powering a first driver using a first power supply having a first magnitude;

powering a second driver using a second power supply having a second magnitude that is less than the first magnitude;

receiving an input voltage;

receiving a control voltage having a magnitude just below the second magnitude;

comparing the input voltage with the control voltage;

enabling either the first driver or the second driver to become an active driver based on said comparing; and the active driver providing the regulated output voltage, wherein the regulated output voltage is a function of the input voltage.

23. The method of claim 22, wherein said enabling either the first driver or the second driver comprises:

enabling the first driver if a magnitude of the input voltage is greater than a magnitude of the control voltage and enabling the second driver if the magnitude of the input voltage is less than or equal to the magnitude of the control voltage; or enabling the first driver if the magnitude of the input voltage is greater than or equal to the magnitude of the control voltage and enabling the second driver if the magnitude of the input voltage is less than the magnitude of the control voltage.

24. The method of claim 22, further comprising generating the control voltage using the second power supply.

25. The method of claim 22, further comprising:

comparing the input voltage with the regulated output voltage; and based on said comparing, controlling the regulated output voltage to be proportional to the input voltage.

26. The method of claim 25, wherein the first driver comprises a first pair of PMOS devices configured as a first current mirror, and the second driver comprises a second pair of PMOS device configured as a second current mirror;

wherein the method further comprises setting a gain of the first current mirror and a gain of the second current mirror to a same value, to increase stability of said controlling the regulated output voltage.

27. The method of claim 22, further comprising increasing and/or decreasing the control voltage to provide hysteresis of the regulated output voltage with respect to the input voltage.

28. The method of claim 22, wherein said providing the regulated output voltage comprises providing the regulated output voltage via an output terminal;

wherein the method further comprises decreasing the control voltage to allow a higher output current at the output terminal.

29. The method of claim 22, further comprising preventing current from flowing from the first power supply to the second power supply.

30. The method of claim 29, wherein the first driver comprises a first pair of PMOS devices configured as a first current mirror, and the second driver comprises a second pair of PMOS device configured as a second current mirror;

wherein said preventing current from flowing from the first power supply to the second power supply comprises biasing an nwell of the second pair of PMOS devices to a bias voltage having a magnitude commensurate with a greatest one of a magnitude of the regulated output voltage and the magnitude of the second power supply.

31. A method for providing a regulated output signal using multiple power supplies, the method comprising;

powering a plurality of drivers using a plurality of power supplies, wherein each power supply of the plurality of power supplies has a different magnitude, wherein said powering the plurality of drivers comprises powering each driver of the plurality of drivers using a different power supply of the plurality of power supplies;

receiving a plurality of control signals, wherein each control signal of the plurality of control signals corresponds to a respective power supply of the plurality of power supplies and has a magnitude just below a magnitude of the corresponding respective power supply;

receiving an input signal;

comparing the input signal with each control signal;

enabling one of the plurality of drivers to become active to operate as an active driver based on said comparing, wherein said enabling comprises keeping all remaining ones of the plurality of drivers inactive; and the active driver providing the regulated output signal, wherein the regulated output signal is a function of the input signal.

32. The method of claim 31, wherein said enabling one of the plurality of drivers comprises enabling a given driver of the plurality of drivers, wherein the given driver is powered by a given power supply of the plurality of power supplies, wherein the given power supply corresponds to a given control signal of the plurality of control signals, wherein the given control signal has a magnitude:

closest to a magnitude of the input signal when compared to respective magnitudes of other ones of the plurality of control signals; and greater than or equal to the magnitude of the input signal.

33. The method of claim 31, further comprising generating at least a subset of the plurality of control signals, wherein said generating at least a subset of the plurality of control signals comprises generating each respective control signal of the subset of the plurality of control signals using the respective power supply corresponding to the respective control signal.

34. The method of claim 31, wherein the plurality of control signals are a plurality of control voltages, the regulated output signal is a regulated output voltage, and the input signal is an input voltage.

35. The method of claim 31 further comprising:

comparing the input signal with the regulated output signal; and based on said comparing, controlling the regulated output signal to be proportional to the input voltage.

36. The method of claim 31, wherein said providing the regulated output signal comprises providing the regulated output signal via an output terminal;

wherein the method further comprises decreasing respective magnitudes of at least a subset of the plurality of control voltages to allow a higher output current at the output terminal.

37. The method of claim 31, further comprising preventing current from flowing from any one of the plurality of power supplies to any other one of the plurality of power supplies that has a lower magnitude than the any one of the plurality of power supplies.

38. A voltage regulator system comprising:

an input terminal configured to receive an input voltage;

an output terminal configured to provide a regulated output voltage, wherein the regulated output voltage is a function of the input voltage;

a plurality of power supplies, wherein each one of the plurality of power supplies has a different magnitude;

a plurality of drivers, wherein each respective driver of the plurality of drivers is configured to be powered by a different one of the plurality of power supplies and has a respective driver output coupled to the output terminal to drive the regulated output voltage when the respective driver is active;

a first circuit operable to generate a plurality of control signals, wherein each one of the plurality of control signals corresponds to a respective one of the plurality of power supplies and has a magnitude just below a magnitude of the corresponding respective one of the power supplies; and a second circuit operable to enable one of the plurality of drivers to be active, and further operable to compare the input voltage with each one of at least a subset of the plurality of control voltages to determine which one of the plurality of drivers to enable;

wherein the second circuit is operable to enable one of the plurality of drivers to be active while keeping all other ones of the plurality of drivers inactive at any given time.

* * * * *